United States Patent
Ueffing et al.

(10) Patent No.: US 8,986,081 B2
(45) Date of Patent: Mar. 24, 2015

(54) DEVICE AND METHOD FOR PROCESSING CARCASSES OF LIVESTOCK

(71) Applicant: Humboldt B.V., Lichtenvoorde (NL)

(72) Inventors: Arno Hermanus Maria Ueffing, Groenlo (NL); Niels Antonio William Koster, Beltrum (NL)

(73) Assignee: Humboldt B.V., Lichtenvoorde (NL)

( * ) Notice: Subject to any disclaimer, the term of this patent is extended or adjusted under 35 U.S.C. 154(b) by 105 days.

(21) Appl. No.: 13/670,876

(22) Filed: Nov. 7, 2012

(65) Prior Publication Data

US 2013/0303065 A1 Nov. 14, 2013

(30) Foreign Application Priority Data

Nov. 8, 2011 (NL) ...................................... 2007744

(51) Int. Cl.
*A22C 25/00* (2006.01)
*A22B 5/00* (2006.01)

(52) U.S. Cl.
CPC ............. *A22B 5/0041* (2013.01); *A22B 5/0023* (2013.01); *Y10S 901/41* (2013.01)
USPC ........................................... 452/156; 901/41

(58) Field of Classification Search
CPC .. A22B 5/0041; A22B 5/0029; A22B 5/0005; A22B 5/0035; A22B 5/007; A22B 5/0094; A22B 5/20; A22B 5/0023; A22B 5/10; A22B 5/16; A22B 5/165; A22B 5/166; A22B 5/201; A22B 7/001; A22C 21/0053
USPC .................................................. 452/155–159
See application file for complete search history.

(56) References Cited

U.S. PATENT DOCUMENTS

| | | | | | |
|---|---|---|---|---|---|
| 4,667,371 | A | * | 5/1987 | Vogt | 452/152 |
| 5,162,016 | A | * | 11/1992 | Malloy | 452/149 |
| 5,314,375 | A | * | 5/1994 | O'Brien et al. | 452/157 |
| 5,334,084 | A | * | 8/1994 | O'Brien et al. | 452/157 |
| 5,820,452 | A | * | 10/1998 | Jacobs et al. | 452/117 |
| 5,944,598 | A | * | 8/1999 | Tong et al. | 452/158 |
| 7,179,163 | B1 | * | 2/2007 | Vedsted et al. | 452/121 |
| 7,285,040 | B2 | * | 10/2007 | Ilch et al. | 452/150 |
| 7,404,759 | B2 | * | 7/2008 | Sato | 452/157 |
| 2004/0058636 | A1 | | 3/2004 | Hinsch et al. | |

FOREIGN PATENT DOCUMENTS

| | | |
|---|---|---|
| DE | 102007021094 B3 | 8/2008 |
| EP | 1815743 A1 | 8/2007 |
| GB | 2427121 A | 12/2006 |
| WO | 2007042234 A1 | 4/2007 |

* cited by examiner

*Primary Examiner* — Richard Price, Jr.
(74) *Attorney, Agent, or Firm* — The Webb Law Firm

(57) ABSTRACT

The present invention relates to a device for processing carcasses of livestock such as cattle, pigs and sheep, comprising: at least two dressing tools for performing a dressing process on livestock carcasses, and a robot arm carrying the dressing tool. The invention also relates to a method for processing carcasses of livestock using such a device.

21 Claims, 5 Drawing Sheets

DEVICE AND METHOD FOR PROCESSING CARCASSES OF LIVESTOCK

BACKGROUND OF THE INVENTION

1. Field of the Invention

The present invention relates to a device for processing carcasses of livestock, comprising: at least two dressing tools for performing a dressing process on livestock carcasses, and a robot arm carrying the dressing tool. The invention also relates to a method for processing livestock carcasses using such a device. Livestock carcasses are understood in this context to mean more particularly carcasses of cattle, pigs and sheep. The term carcass should further be interpreted broadly such as to also include carcass parts, such as for instance half-carcasses which may or may not be fully separated from each other.

2. Description of Related Art

Livestock carcasses are usually processed in slaughter lines in which the carcasses (or carcass parts) for processing are carried past a plurality of processing stations. The processing stations can be manned by personnel performing determined processes, although there is a trend toward mechanizing or automating dressing operations as far as possible. Use can be made here in a slaughter line of one or more robot arms with which specific dressing processes are performed automatically. Applying a robot arm to process livestock carcasses has the advantage that further automation of the dressing process is thus made possible while making use of one or more standardized robot arms. Drawbacks of applying one or more robot arms for processing livestock carcasses is that robot arms can be costly in use and that the capacity thereof is relatively limited.

The present invention has for its object to apply a robot arm in order to enable more efficient processing of livestock carcasses and also to further increase the quality of dressing processes performed using a robot arm.

SUMMARY OF THE INVENTION

The present invention provides for this purpose a device for processing livestock carcasses, comprising: a dressing tool for performing a dressing process on livestock carcasses, and a robot arm carrying the dressing tool, wherein the device also comprises at least a second similar dressing tool, which first and second dressing tools are carried by a single robot arm. Providing a robot arm with a plurality of dressing tools has the result, among others, of greater flexibility in the use of the robot aim, and can also decrease the susceptibility to malfunction of a device according to the present invention. Depending on determined conditions, it is thus possible for instance to opt to first perform a number of dressing processes using a clean dressing tool in each case and to subsequently clean all dressing tools carried by a robot aim in a single cleaning operation. The device according to the present invention does however also provide the option of performing dressing processes using a clean dressing tool each time, but without the dressing process being held up here by the time required for cleaning the dressing tool; this is because cleaning need no longer form part of the critical path of the dressing process. Making use of at least two similar (or in a further form even at least two identical) dressing tools carried by a single robot arm, and wherein the device is also provided with at least one displaceable cleaning tool, creates the option of cleaning a soiled dressing tool during performing of a (subsequent) dressing process by the second similar dressing tool. In addition, it is for instance possible, in the case of malfunction of a determined dressing tool, to compensate this with another dressing tool carried by the same robot arm as the failing dressing tool or to have an additional operation performed by another robot arm. A further advantage is that the capacity of a relatively costly robot arm can also be better utilized, this obviously resulting in a cost advantage.

In an embodiment variant the device comprises a displaceable cleaning tool for the dressing tool, the cleaning tool being displaceable such that, as at least the dressing tool moves through a processing cycle, the cleaning tool co-displaces with the dressing tool over at least a part of a displacement path followed by the dressing tool during the processing cycle for the purpose of cleaning the dressing tool. It is noted here that the processing of carcasses is a process in which hygiene is evidently a critical factor. In order to prevent cross-infection between carcasses it is desirable to clean a dressing tool with great regularity, preferably during each processing cycle. The present invention now makes it possible during a "return movement", which was formerly a movement for the sole purpose of carrying the dressing tool back to a desired starting position, for a dressing tool to be simultaneously cleaned. It is then the case that cleaning of the dressing tool no longer affects at least partially the "critical path" of a processing cycle; this is because cleaning coincides with the displacement of the dressing tool which is necessary anyway. This therefore results in an increase in the production capacity when the device is compared to a dressing tool which is driven by a robot arm and which is placed in a stationary cleaning tool for the purpose of the cleaning; the robot arm then has to remain stationary for a time for the purpose of cleaning the dressing tool, and the full cleaning process thus adds to the cycle time. Another advantage is that a better cleaning becomes possible due to this embodiment variant of the device according to the present invention when the cycle time is kept the same as the cycle time of a dressing tool which is driven by a robot arm and placed in a stationary cleaning tool for cleaning purposes. It is of course also possible to opt for a combination of both advantages by limiting the cycle time to only a limited extent in combination with a more intensive (i.e. more prolonged) cleaning. In addition to such a limitation of the cycle time however, the cleaning time of the dressing tool can also be extended simultaneously with or independently of the above solution by adding to the device according to the present invention more than two (optionally also similar) dressing tools carried by the same robot arm. If the device of the present invention comprises for instance three identical dressing tools, the cleaning time per dressing tool can be doubled relative to a device comprising two identical dressing tools.

In an embodiment variant at least two similar dressing tools and a cleaning tool are carried by the same robot arm. It is then also possible here for the cleaning tool and the at least two dressing tools to be displaceable relative to each other between at least a position for cleaning the dressing tool with the cleaning tool and a position in which the dressing tool, unobstructed by the cleaning tool, can perform a dressing process on a carcass. During an "operating stroke" of the robot arm the dressing tool can then perform a process unimpeded by the cleaning tool, and during a "return stroke" of the robot arm the cleaning tool can then be placed close to the at least one dressing tool such that an effective cleaning is made possible and wherein, during cleaning of the at least one dressing tool, at least another dressing tool can perform a process unobstructed by the cleaning tool. It may then be possibly the case here that the at least one dressing tool for cleaning cannot be used during the return stroke because it is covered wholly or otherwise by the cleaning tool, although this need not constitute a drawback. After all, the one dressing tool need not normally perform a dressing process on a carcass during the return stroke, and there is the possibility of the other dressing tool performing an operating stroke during the return stroke of the one dressing tool. It is also possible by means of the mutual displaceability of the cleaning tool and the dressing tool to wholly (or substantially wholly) enclose the dressing tool during the cleaning such that uncontrolled spread of contamination is prevented. It is noted in this respect that the cleaning tool is desirably provided with a displaceable hood, casing or housing embodied such that this can close round one or more dressing tools such that during cleaning of the dressing tool no or hardly any contamination of the surrounding area can occur. Dissemination of cleaning liquid and/or slaughter products to the surrounding area will particularly have to be prevented hereby; these products are after all collected in the hood, casing or housing and discharged therefrom in controlled manner.

Alternatively, it is also possible for the cleaning tool to be connected displaceably to the fixed world. This therefore means that the cleaning tool is not carried by the robot arm, although it is then still possible (as is also the case when the cleaning tool is indeed carried by the robot arm) for the cleaning tool to be co-displaced by the robot arm over at least a part of a displacement path followed during the processing cycle. In such a situation the invention then provides for mounting of at least two dressing tools on the robot arm. A separate drive for displacing the cleaning tool hereby becomes unnecessary.

The plurality of dressing tools on a robot aim comprise at least two similar dressing tools, which similar dressing tools can optionally also be suitable for performing differing dressing processes. Yet another option consists of having the robot arm carry at least two similar dressing tools with a further one or more other dressing tools in addition. An advantage of assembling at least two dressing tools on a single robot arm is for instance that the cleaning time of a dressing tool can thus be considerably lengthened without this resulting in lengthening of the cycle time. This is because a dressing tool can then be cleaned not only during a return stroke, but it also possible to opt to clean the dressing tool then not in use during a processing stroke. It thus also becomes possible to limit downtime of a slaughter line as a consequence of malfunction or maintenance. When at least two similar dressing tools are assembled on a single robot arm for the purpose of performing different dressing processes, it becomes possible to perform different dressing processes with a single robot arm. The dressing tools can for instance consist of the following dressing tools (or of combinations of the following dressing tools): saw, knife, cleaver, shears, stamp, gripper, bracket and pusher. Using these dressing tools it becomes possible to perform dressing processes such as: opening the breastbone, splitting a carcass, removing the anus, cutting of legs, cutting the neck, cleaving the pubic bone, removing the pizzle, opening the abdomen, evisceration, removal of (fat) parts, severing sinews, the removal of testicles and stamping of carcass parts.

It has already been stated above in respect of the robot arm that a robot arm generally available on the market can be applied for this purpose. Depending on the processes to be supported, it is possible to opt here for a robot arm which is at least four-axis or, for more complex operations, a six-axis robot arm. The output shaft of the robot aim will usually carry at least two dressing tools and/or a cleaning tool here, although it is also possible for a shaft other than the output shaft of the robot arm to carry at least two dressing tools and/or a cleaning tool. In yet another variant it is also possible for the output shaft of the robot arm to carry an additional drive. The mutual displaceability of dressing tools and cleaning tool can be realized by mounting at least two dressing tools or a cleaning tool on this additional drive, or one of a plurality of available dressing tools can be placed in an operational mode.

For good operation of the cleaning tool, it is possible to opt to provide it with a liquid feed and a liquid discharge. The cleaning tool can further be provided with other components, such as for instance nozzles, mechanical brush elements and a protective hood.

The present invention also provides a method for processing carcasses of livestock, comprising the processing steps of: A) performing a process on at least one livestock carcass using a dressing tool operated by a robot arm, and B) performing a process using a second dressing tool carried by the same robot arm. Similar dressing processes can be performed on a carcass using the first and the second dressing tools, although it is also possible for different types of dressing process to be carried out on a carcass using the first and the second similar dressing tools. Using such a method the advantages can be realized as already described above with reference to the device according to the present invention.

In another variant a cleaning tool and the dressing tools are displaced relative to each other during a processing cycle between a cleaning position for cleaning one or more dressing tool(s) and an operating position in which the dressing tool can perform a process on a carcass unobstructed by the cleaning tool. The cleaning tool can be displaced here by the robot arm or by a drive other than the robot arm. Successive dressing processes can thus be performed by individual similar dressing tools, wherein at least one dressing tool is always being cleaned by the cleaning tool during a dressing process. The successive dressing processes can be similar (or the same) processes, but can also be dressing processes differing from each other.

BRIEF DESCRIPTION OF THE DRAWINGS

The present invention will be further elucidated on the basis of the non-limitative exemplary embodiments shown in the following figures. Herein.

DETAILED DESCRIPTION OF THE PREFERRED EMBODIMENTS

Figure 1A:
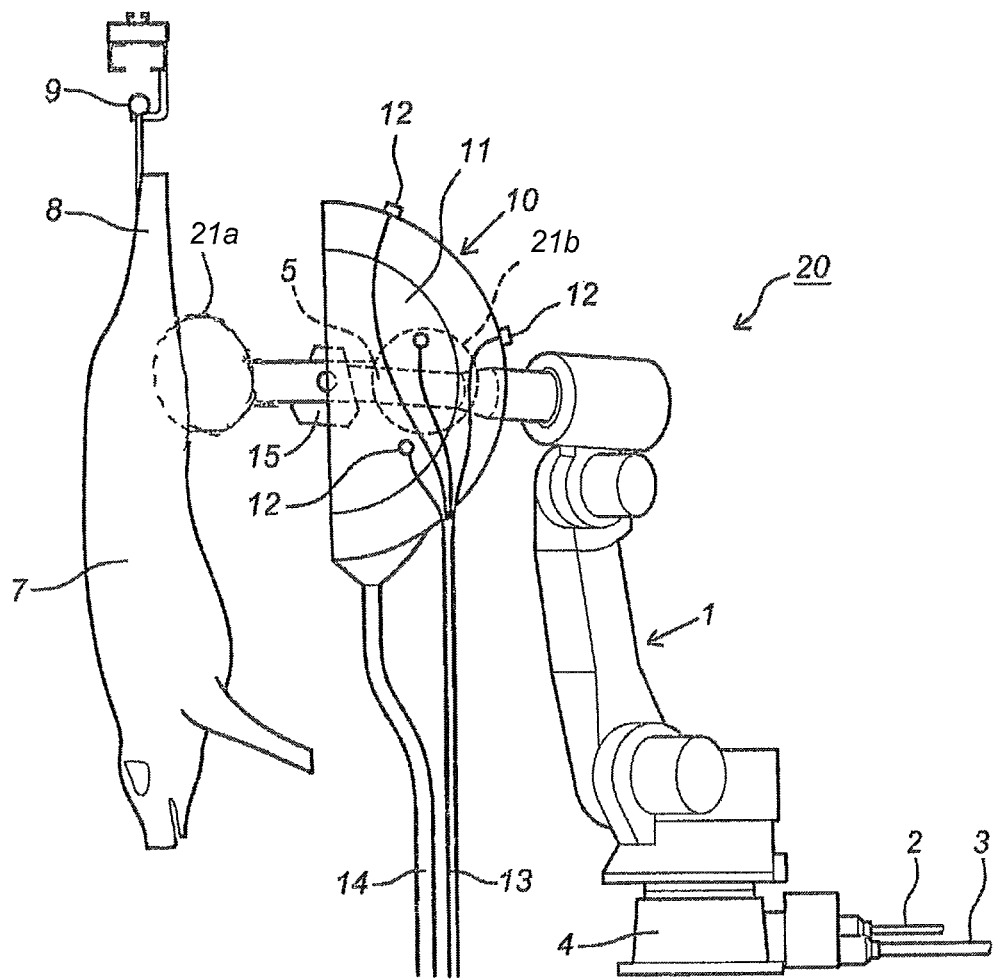
FIG. 1A is a schematic view of a device for processing pig carcasses provided with a robot arm with two sawing tools and a cleaning tool.

FIG. 1A shows a six-axis robot arm 1 which is connected by means of a control line 2 and a power line 3 to an external control and an external power supply (not shown here). Robot arm 2 is provided with a foot 4 which is connected to the fixed world, and the output shaft 5 of robot arm 1 is situated on the side of robot arm 1 remote from foot 4. Two identical saws 21a, 21b and other parts are mounted on this output shaft 5. The first dressing tool here is a first saw 21a which is mounted on robot arm 1 and which is in an operational mode. A pig carcass 7 is suspended by means of the hind legs 8 from a guide 9 with which the pig carcasses 7 can be carried along different processing stations. The second dressing tool here is a second saw 21b which is mounted on robot arm 1 and which in the shown situation is not being used to process the pig carcass 7. In addition to the two saws 21a, 21b, robot arm 1 also carries a cleaning tool 10 which is shown here as a housing 11 through which nozzles 12 protrude inward. Second saw 21b is situated in housing 11 of cleaning tool 10 so that in the shown situation it can be cleaned. This therefore means that, while first saw 21a is being used to perform a process on the pig carcass 7, second saw 21b can be cleaned.

Nozzles 12 are provided with a cleaning fluid by feed conduits 13. Also connecting to housing 11 of cleaning tool 10 is a discharge conduit 14 with which the used cleaning fluid can be discharged. Once first saw 21 a has performed a processing step, first saw 21 a can be displaced into cleaning tool 10 (by means of a relative displacement of first saw 21a and cleaning tool 10) and second saw 21b will move clear of cleaning tool 10; an additional drive 15 is placed for this purpose on output shaft 5 of robot arm 1. Once first saw 21a is situated in cleaning tool 10, the cleaning process can begin, although robot arm 1, or at least the output shaft 5 of robot arm 1, can simultaneously be displaced to a position where second saw 21b can begin to process a following pig carcass 7 or perform a subsequent processing step on the already processed pig carcass.

Figure 1B:
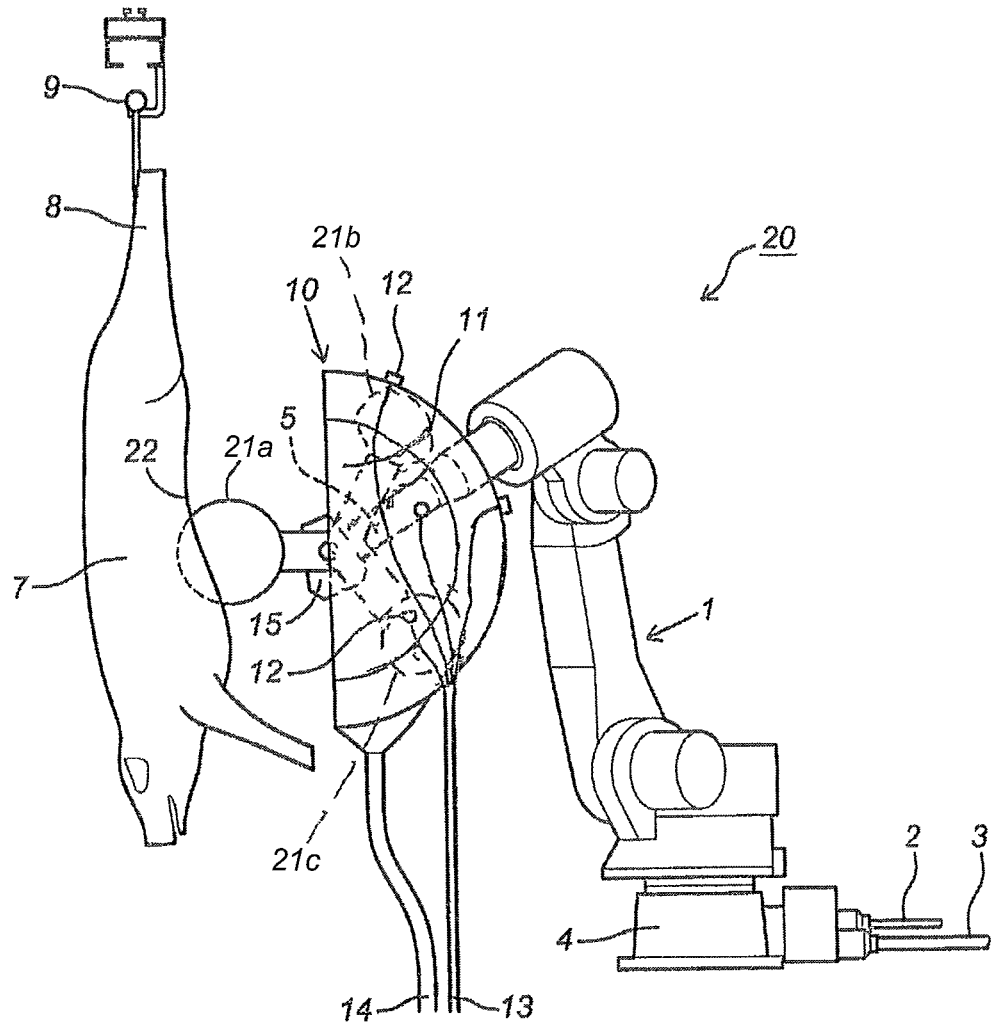
FIG. 1B is a schematic view of a device for processing pig carcasses provided with a robot arm with three sawing tools and a cleaning tool.

FIG. 1B once again shows device 20 of FIG. 1A for processing pig carcasses, although now in a situation where output shaft 5 is provided with three identical saws 21a, 21b, 21c for processing pig carcass 7. In addition, the abdomen 22 of pig carcass 7 is being opened by saw 21a in the situation shown according to FIG. 1B. Saw 21a is usually, though not necessarily, formed here by a rotating saw blade. During this opening of abdomen 22 of pig carcass 7 the saw 21a is displaced precisely along a desired path of movement by robot arm 1. A second saw 21b and a third saw 21c are meanwhile located in housing 11 of cleaning tool 10 such that they can be cleaned. It should be noted here that, compared to the device as shown in FIG. 1A, the cleaning time of second saw 21b (and also that of third saw 21c) is doubled.

Figure 2A:
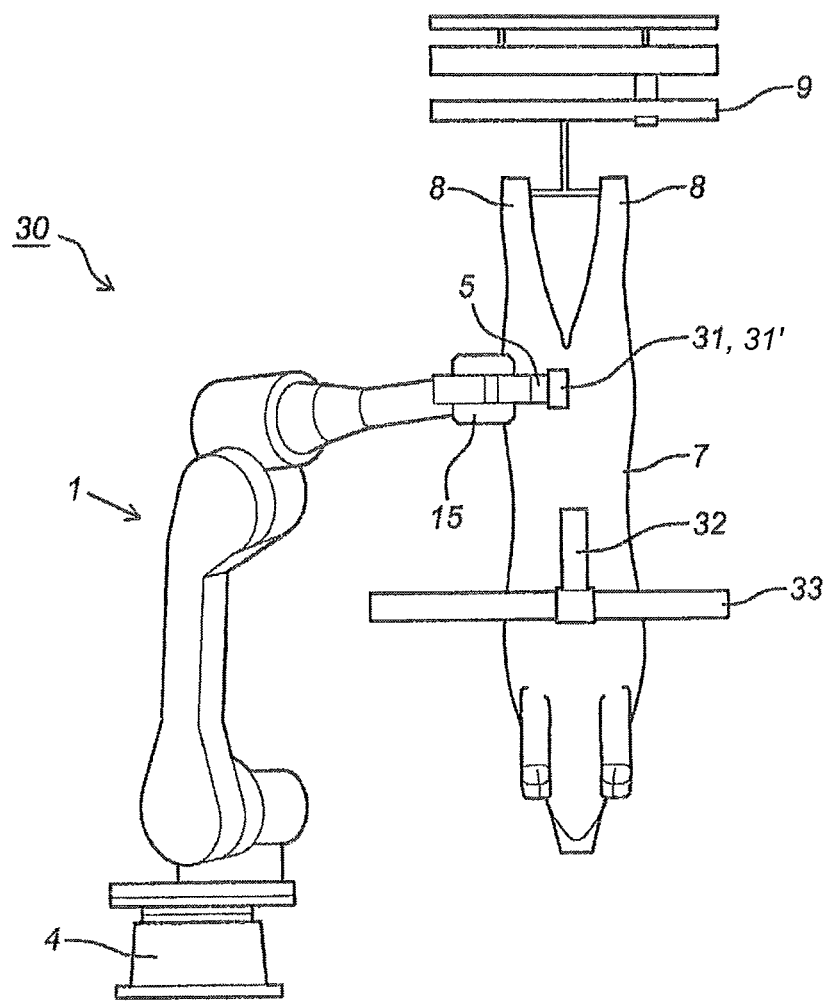
FIGS. 2A-2C show three schematic views of three different operational positions of a device for processing pig carcasses provided with a robot arm with two dressing tools and a cleaning tool connected displaceably to the fixed world.
Figure 2B:
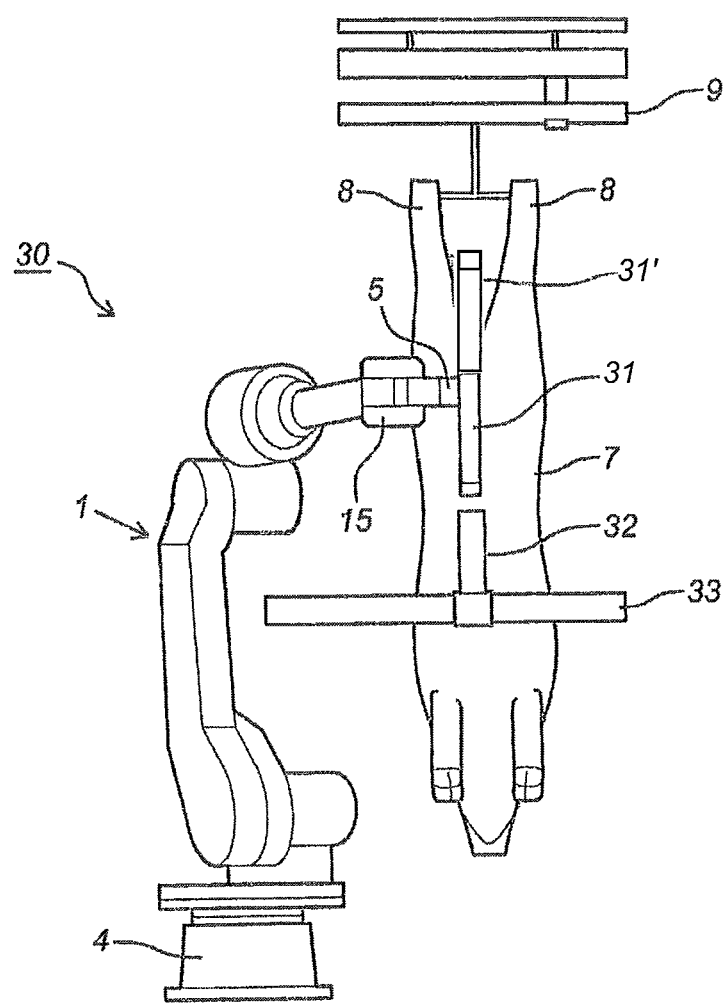
Figure 2C:
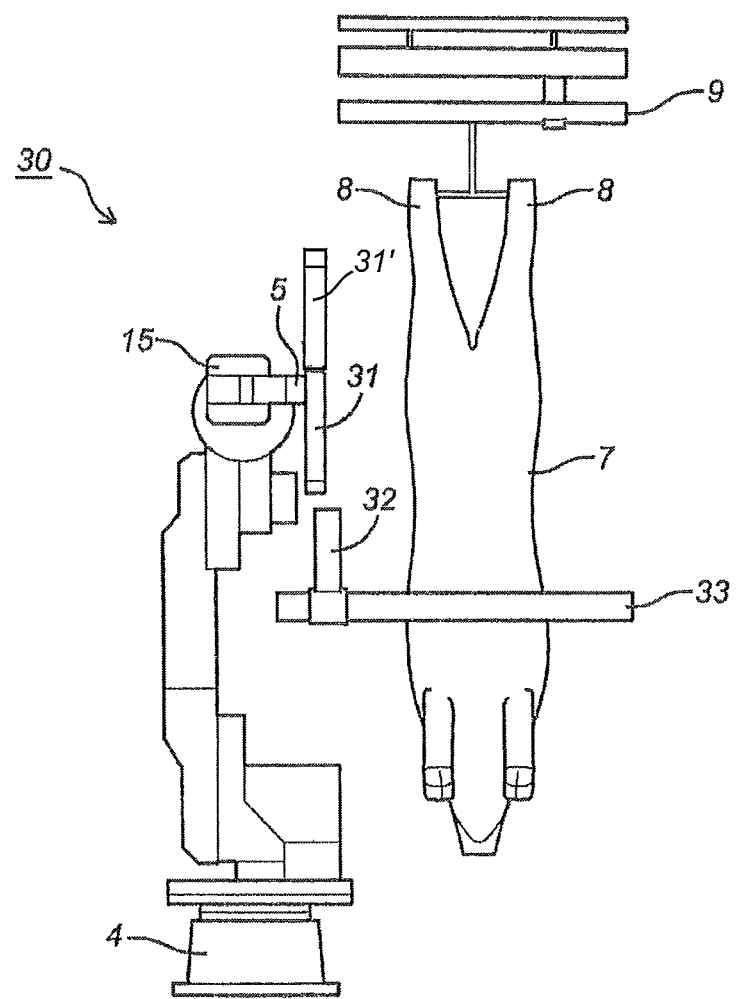

FIG. 2A shows a device 30 for processing pig carcasses 7 provided with a robot arm 1 with two identical dressing tools 31, 31' (in this case two schematically shown pubic bone cleavers of which only one is visible in the view of FIG. 2A) and a cleaning device 32 connected displaceably to the fixed world. Cleaning device 32 is for this purpose slidable along a guide rod 33. The process of cleaning dressing tools 31, 31' is further elucidated with reference to FIGS. 2B and 2C. In FIG. 2B the first dressing tool 31 has completed the process applied to the carcass 7, and this first dressing tool 31 is moved to cleaning tool 32 to be introduced therein while the second dressing tool 31' is located outside cleaning tool 32. It is noted here that it is alternatively possible to embody cleaning tool 32 such that both dressing tools 31, 31' can be introduced simultaneously into cleaning tool 32 such that they can both always be cleaned during the return stroke of dressing tools 31, 31; this does of course enhance the options for cleaning the dressing tools 31, 31' without this needing to result in a longer cycle time. Once the first dressing tool 31 has been introduced into cleaning tool 32, cleaning of the first dressing tool 31 can begin. During this cleaning the cleaning tool 32 is displaced by the first dressing tool 31 along guide rod 33 (to the left in the figure) such that both dressing tools 31, 31' are moved back to a position close to a location where the first dressing tool 31 is taken out of cleaning tool 32 (see FIG. 2C) and can be utilized once again to perform a subsequent process on a pig carcass 7. During the return stroke of the dressing tools 31, 31' carried by robot arm 1 the first dressing tool 31 is simultaneously also cleaned. Cleaning tool 32 need not be provided with a separate drive. Means need only be provided to move cleaning tool 32 back from the position shown in FIG. 2C to the situation in which it is situated in FIG. 2A. This is possible for instance by means of placing a spring which is tensioned during the displacement during the cleaning process (sliding the cleaning tool 32 along guide rod 33 to the left in the figure), which developed tension then moves cleaning tool 32 back along guide rod 33 (urging it to the right in the figure).

The invention claimed is:

1. A device for processing carcasses of livestock, comprising:
    a dressing tool for performing a process on livestock carcasses, and
    a robot arm carrying the dressing tool,
wherein the device also comprises at least a second similar dressing tool, which first and second dressing tools are carried by a single robot arm;
    wherein the dressing tools are displaceably carried by the robot arm to perform successive dressing processes; and
    wherein the dressing tools are displaceable relative to each other between at least a position for cleaning a dressing tool and an operating position in which a dressing tool can perform a dressing process on a carcass.

2. The device as claimed in claim 1, wherein the device comprises a displaceable cleaning tool, the cleaning tool being displaceable such that, as a dressing tool moves through a processing cycle operated by the robot arm, the cleaning tool co-displaces with the dressing tool over at least a part of a displacement path followed by the dressing tool during the processing cycle for the purpose of cleaning the dressing tool.

3. The device as claimed in claim 2, wherein the cleaning tool is provided with a liquid feed and a liquid discharge.

4. The device as claimed in claim 1, wherein the cleaning tool and the at least two dressing tools for performing a process on livestock carcasses are carried by the same robot arm.

5. The device as claimed in claim 1, wherein the cleaning tool and the at least two dressing tools are displaceable relative to each other between at least a position for cleaning the dressing tool with the cleaning tool and a position in which at least one dressing tool, unobstructed by the cleaning tool, can perform a dressing process on a carcass.

6. The device as claimed in claim 1, wherein the cleaning tool is connected displaceably to the fixed world.

7. The device as claimed in claim 6, wherein the cleaning tool is co-displaced by the robot arm over at least a part of a displacement path followed during the processing cycle.

8. The device as claimed in claim 1, wherein the device comprises at least two similar dressing tools for performing similar dressing processes.

9. The device as claimed in claim 1, wherein the device comprises at least two similar dressing tools for performing differing dressing processes.

10. The device as claimed in claim 1, wherein the device comprises at least two similar dressing tools from the group of: saw, knife, cleaver, shears, stamp, gripper and pusher.

11. The device as claimed in claim 1, wherein the robot arm is at least four-axis, preferably six-axis.

12. The device as claimed in claim 1, wherein the output shaft of the robot arm carries at least two dressing tools and/or a cleaning tool.

13. The device as claimed in claim 12, wherein a shaft other than the output shaft of the robot arm also carries at least two dressing tools and/or a cleaning tool.

14. The device as claimed in claim 1, wherein the output shaft of the robot arm carries an additional drive.

15. A method for processing carcasses of livestock, comprising the processing steps of:
   A) performing a dressing process on at least one livestock carcass using a dressing tool operated by a robot arm, and
   B) performing a second process using a second dressing tool carried by the same robot arm; wherein the dressing tools are displaced relative to each other between at least a position for cleaning the dressing tool and an operating position in which the dressing tool can perform a dressing process on the livestock carcass.

16. The method as claimed in claim 15, wherein similar dressing processes are performed on a carcass using the first and the second dressing tools.

17. The method as claimed in claim 15, wherein different types of dressing process are performed on a carcass using the first and the second dressing tools.

18. The method as claimed in claim 15, wherein a cleaning tool and the dressing tools are displaced relative to each other during a processing cycle between a cleaning position for cleaning the dressing tool and an operating position in which the dressing tool can perform a dressing process on a carcass unobstructed by the cleaning tool.

19. The method as claimed in claim 18, wherein a cleaning tool which is separate of the robot arm is displaced by a drive other than the robot arm.

20. The method as claimed in claim 18, wherein a dressing process operated by a robot arm consists of a dressing process from the following group of: opening the breastbone, removing the pizzle, splitting a carcass, removing the anus, cutting of legs, cutting the neck, cleaving the pubic bone, opening the abdomen, evisceration, removal of (fat) parts, severing sinews, the removal of testicles and stamping of carcass parts.

21. The method as claimed in claim 18, wherein successive dressing processes are performed on livestock carcasses by individual similar dressing tools, wherein at least one dressing tool is always being cleaned by the cleaning tool during a dressing process.

* * * * *